(12) United States Patent
Tamura

(10) Patent No.: US 10,908,709 B2
(45) Date of Patent: Feb. 2, 2021

(54) WRITING INPUT DEVICE AND WRITING INPUT SYSTEM

(71) Applicant: SHARP KABUSHIKI KAISHA, Sakai (JP)

(72) Inventor: Naoki Tamura, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 16/700,643

(22) Filed: Dec. 2, 2019

(65) Prior Publication Data

US 2020/0183508 A1   Jun. 11, 2020

(30) Foreign Application Priority Data

Dec. 7, 2018   (JP) .................. 2018-229850

(51) Int. Cl.
*G06F 3/0354* (2013.01)
*G10K 15/04* (2006.01)
*G06F 3/041* (2006.01)

(52) U.S. Cl.
CPC .......... *G06F 3/03545* (2013.01); *G06F 3/041* (2013.01); *G10K 15/04* (2013.01)

(58) Field of Classification Search
CPC ...... G06F 3/03545; G06F 3/041; G10K 15/04
See application file for complete search history.

(56) References Cited

U.S. PATENT DOCUMENTS

2016/0125225 A1* 5/2016 Ebihara .................. G06F 3/044
                                                        382/115

FOREIGN PATENT DOCUMENTS

JP   H08-190450 A      7/1996
JP   2005084251 A  *   3/2005

* cited by examiner

*Primary Examiner* — Alexander Eisen
*Assistant Examiner* — Kebede T Teshome
(74) *Attorney, Agent, or Firm* — ScienBiziP, P.C.

(57) ABSTRACT

The present invention provides a touch pen including a writing pressure detector that detects a writing pressure generated by a nib contacting an input surface of a touch panel, a sound producer that produces a pseudo sound of a first touch, based on the writing pressure detected by the writing pressure detector, and a sound outputter that outputs the pseudo sound produced by the sound producer.

7 Claims, 9 Drawing Sheets

| WRITING MODE | CONTENTS |
|---|---|
| M1 | BLACKBOARD AND CHALK |
| M2 | PAPER AND PENCIL |
| M3 | PAPER AND BALLPOINT PEN |
| ... | ... |

FIG. 6

| WRITING MODE | DETERMINATION-USE DATA | SAMPLE SOUND DATA | SOUND VOLUME COEFFICIENT |
|---|---|---|---|
| M1 | DF11 | SF1(FIRST TOUCH SOUND) | 1.2 |
| M1 | DF12 | SF1(FIRST TOUCH SOUND) | 0.5 |
| M1 | DR11 | SR1(FRICTION SOUND) | 1.2 |
| M1 | DR12 | SR1(FRICTION SOUND) | 0.5 |
| M2 | DF21 | SF2(FIRST TOUCH SOUND) | 1.1 |
| M2 | DF22 | SF2(FIRST TOUCH SOUND) | 0.6 |
| M2 | DR21 | SR2(FRICTION SOUND) | 1.1 |
| M2 | DR22 | SR2(FRICTION SOUND) | 0.6 |
| M3 | DF31 | SF3(FIRST TOUCH SOUND) | 1.3 |
| M3 | DF32 | SF3(FIRST TOUCH SOUND) | 0.6 |
| M3 | DR31 | SR3(FRICTION SOUND) | 1.3 |
| M3 | DR32 | SR3(FRICTION SOUND) | 0.6 |

FIG. 7

| DETERMINATION-USE DATA | WRITING PRESSURE WAVEFORM |
|---|---|
| DF11 (FIRST TOUCH SOUND: LOUD) | ← DIFFERENTIAL VALUE |
| DF12 (FIRST TOUCH SOUND: SOFT) | ← DIFFERENTIAL VALUE |
| DR11 (FRICTION SOUND: LOUD) | |
| DR12 (FRICTION SOUND: SOFT) | |

| SAMPLE SOUND DATA | SOUND WAVEFORM |
|---|---|
| SF1<br>(FIRST TOUCH SOUND) |  |
| SR1<br>(FRICTION SOUND) |  |

224

WRITING INPUT DEVICE AND WRITING INPUT SYSTEM

INCORPORATION BY REFERENCE

This application is based upon and claims the benefit of priority from the corresponding Japanese Patent Application No. 2018-229850 filed on Dec. 7, 2018, the entire contents of which are incorporated herein by reference.

BACKGROUND OF THE INVENTION

Field of the Invention

The present disclosure relates to a writing input device and a writing input system capable of performing writing input on a touch panel.

Description of the Background Art

There is known a system for performing writing input on an electronic board (an electronic blackboard, an electronic whiteboard, and the like) such as a touch panel by using an electronic pen such as a stylus pen. Unlike a conventional method of writing on a blackboard with a chalk, a method of writing on a touch panel with an electronic pen generates substantially no writing sound upon writing because a material of the electronic pen and an input surface is different from a material of the chalk and the blackboard. Here, it is known that a writing sound made by a writer contributes to improvement of concentration of a participant in an education field, a meeting, and the like. Conventionally, in the above-described system, a technique for generating a pseudo sound of the writing sound that may be generated upon writing on the blackboard with the chalk has been proposed. For example, a technique for generating the pseudo sound, based on a speed of a pen, has been proposed.

However, the conventional technique has configuration in which the pseudo sound according to a speed of a pen is generated, and the pseudo sound is a sound (friction sound) generated by the pen rubbing (moving on) the input surface when the pen draws a line. Here, normally, when a writer writes with the pen, a hitting sound (first touch sound) is generated by the pen contacting the input surface. The first touch sound is generated every time a writing is performed. In this regard, it is difficult to reproduce the first touch sound with the conventional technique. This deteriorates reproducibility of the writing sound and results in a sense of incongruity.

An object of the present disclosure is to provide a writing input device and a writing input system capable of outputting a pseudo sound of a first touch sound generated when the writing input device such as an electronic pen contacts a contact target such as an input surface.

SUMMARY OF THE INVENTION

A writing input device according to an aspect of the present disclosure is a writing input device capable of performing writing input on a touch panel. The writing input device includes a writing pressure detector that detects a writing pressure generated by a tip end of the writing input device contacting a contact target, a sound producer that produces a pseudo sound, based on the writing pressure detected by the writing pressure detector, and a sound outputter that outputs the pseudo sound produced by the sound producer.

A writing input system according to another aspect of the present disclosure includes a touch panel, and a writing input device capable of performing writing input on the touch panel. The writing input system further includes a writing pressure detector that detects a writing pressure generated by a tip end of the writing input device contacting a contact target, a sound producer that produces a pseudo sound, based on the writing pressure detected by the writing pressure detector, and a sound outputter that outputs the pseudo sound produced by the sound producer.

According to the present disclosure, it is possible to output a pseudo sound of a first touch sound generated when a writing input device such as an electronic pen contacts a contact target such as an input surface.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a table showing an example of sound data information stored in the storage of the touch pen according to the embodiment of the present disclosure;

FIG. 7 is a table showing an example of determination-use data stored in the storage of the touch pen according to the embodiment of the present disclosure;

DESCRIPTION OF THE PREFERRED EMBODIMENTS

An embodiment of the present disclosure will be described with reference to the attached drawings below. It is noted that the following embodiment is an example in which the present disclosure is embodied, and does not intend to limit the technical scope of the present disclosure.

Figure 1:
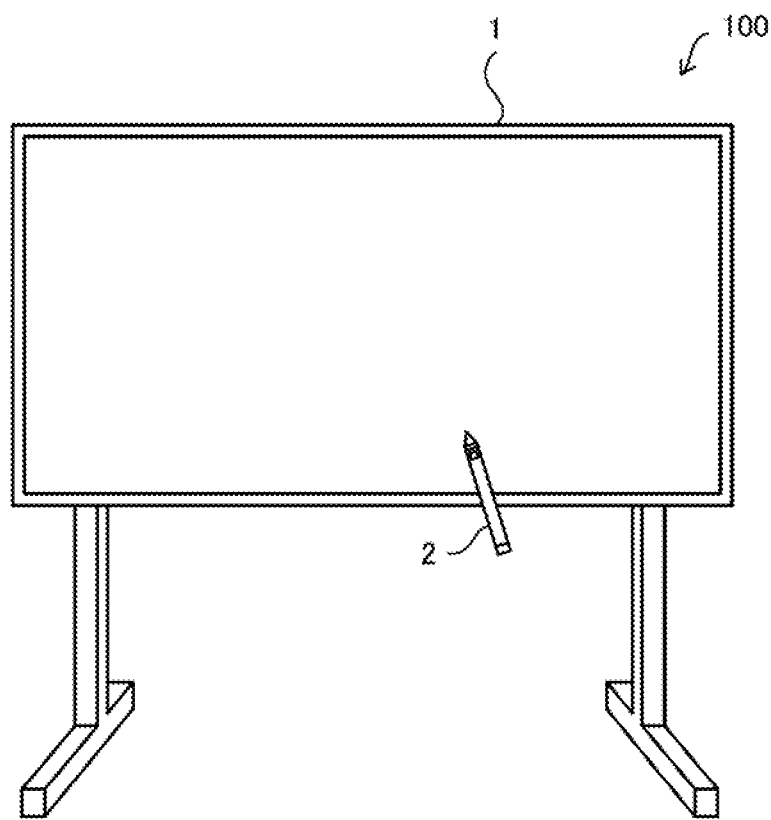
FIG. 1 is an external view illustrating a configuration of a writing input system according to an embodiment of the present disclosure.

As illustrated in FIG. 1, a writing input system 100 according to the embodiment of the present disclosure includes an electronic board 1 and a touch pen 2 capable of inputting a handwritten character and the like by writing on the electronic board 1. The electronic board 1 includes a display panel 13 and a touch panel 14 described later, detects a contact position when a nib 20 (see FIG. 3) of the touch pen 2 contacts an input surface (touch surface) of the touch panel 14, and draws information (such as a handwritten character) on a display surface of the display panel 13, based on the contact position. The writing input system 100 is an example of a writing input system of the present disclosure, and the touch pen 2 is an example of a writing input device of the present disclosure.

Electronic Board 1

In the present disclosure, an electronic board having a known configuration can be applied. Here, as an example, a brie configuration of the electronic board 1 will be described, and the electronic board 1 will not be described in detail.

The electronic board 1 includes a controller 11, a storage 12, the display panel 13, the touch panel 14, and a communicator 15.

The display panel 13 is a display that displays an image, and is, for example, a liquid crystal display.

The touch panel 14 receives a touch input from a user, with the touch pen 2, on the touch panel 14. The touch panel 14 may be a capacitive touch panel or a pressure sensitive touch panel. That is, the touch panel 14 may be any device capable of accepting a user's touch input such as a touch. The touch panel 14 may be arranged on the front of the display panel 13 or may be built in the display panel 13, Alternatively, the touch panel 14 and the display panel 13 may be arranged at locations separated from each other and may be configured to communicate with each other. Here, an integrated touch panel display will be described in which the touch panel 14 is arranged on the front of the display panel 13, and the touch panel 14 and the display panel 13 are integrally formed, as an example of the electronic board 1.

The communicator 15 is a communication interface that connects the electronic board 1 to a network in a wired or wireless manner, and executes data communication, according to a predetermined communication protocol, with an external device such as the touch pen 2 via the network.

The storage 12 is a non-volatile storage including a hard disk drive (HDD), or a solid state drive (SSD) that store various types of information. The storage 12 stores various types of control programs. The control programs are recorded non-temporarily on a computer-readable recording medium such as a universal serial bus (USB), a compact disc (CD), or a digital versatile disc (DVD) (all of which are registered trademarks), read by a reading device (not illustrated) such as a USB drive, a CD drive, or a DVD drive electrically connected to the electronic board 1, and stored in the storage 12. The control programs may be downloaded from an external device via a network and stored in the storage 12.

The controller 11 includes a control device such as a central processing unit (CPU), a read only memory (ROM), and a random access memory (RAM). The CPU is a processor that executes various types of arithmetic processes. The ROM is a non-volatile storage in which a control program such as basic input output system (BIOS) and operating system (OS) for causing the CPU to execute various types of arithmetic processes is stored in advance. The RAM is a volatile or non-volatile storage that stores various types of information, and is used as a temporary storage memory (working area) for various types of processes executed by the CPU. The controller 11 controls the electronic board 13 by causing the CPU to execute the various types of control programs stored in advance in the ROM or the storage 12.

Figure 2:
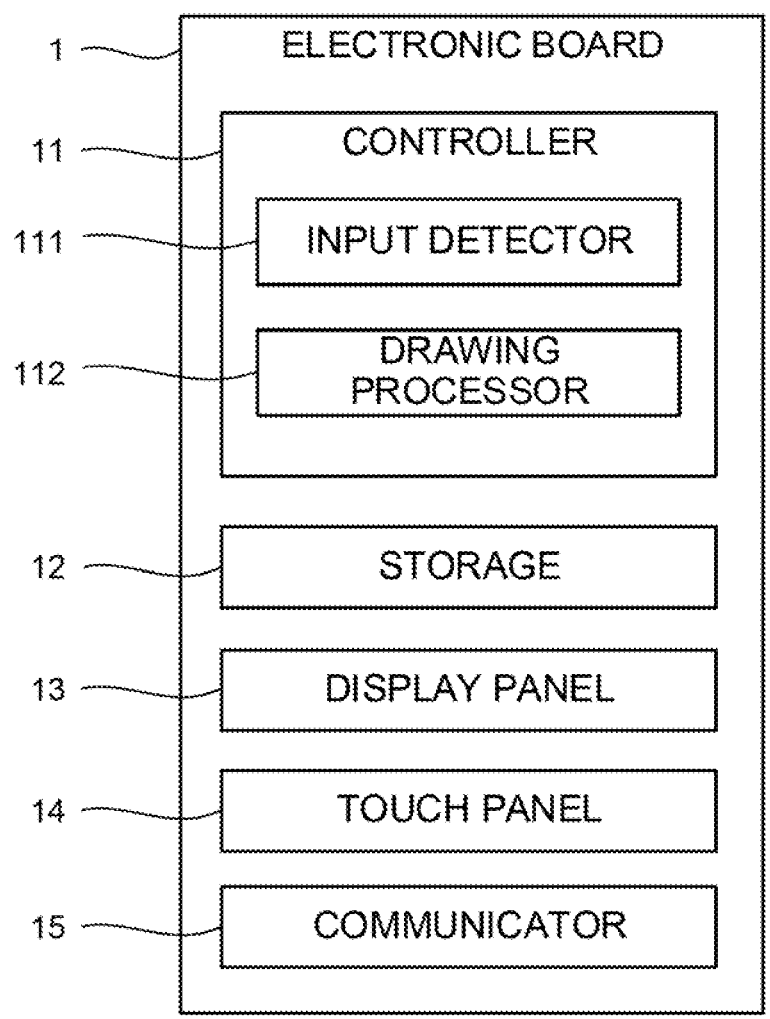
FIG. 2 is a block diagram illustrating a configuration of an electronic board according to the embodiment of the present disclosure.

Specifically, the controller 11 includes various types of process operators such as an input detector 111 and a drawing processor 112, as illustrated in FIG. 2. It is noted that the controller 11 functions as the various types of process operators by causing the CPU to execute various types of processes according to the control programs. Moreover, some or all of the process operators included in the controller 11 may include an electronic circuit. It is noted that the control programs may be programs for causing a plurality of processors to function as the various types of process operators.

The input detector 111 detects the touch input to the touch panel 14. Specifically, the input detector 111 detects position coordinates input (designated) by the touch pen 2 in a contact target (for example, the input surface of the touch panel 14). For example, the input detector 111 detects the position coordinates by detecting a change in capacitance between the touch pen 2 and the input surface. A method for detecting the position coordinates is not limited to a capacitance method, and may include various types of known methods.

The drawing processor 112 draws information corresponding to the touch input detected by the input detector 111, in the display panel 13. For example, the drawing processor 112 draws a handwritten character corresponding to the touch input at a predetermined position in the display panel 13, based on position information of the touch input detected by the input detector 111.

Touch Pen 2

The touch pen 2 is an electronic pen (also referred to as "stylus pen") used by a user to perform a touch input on the electronic board 1. For example, the user uses the touch pen 2 to perform a touch input on the input surface (contact target) of the touch panel 14.

Figure 3:
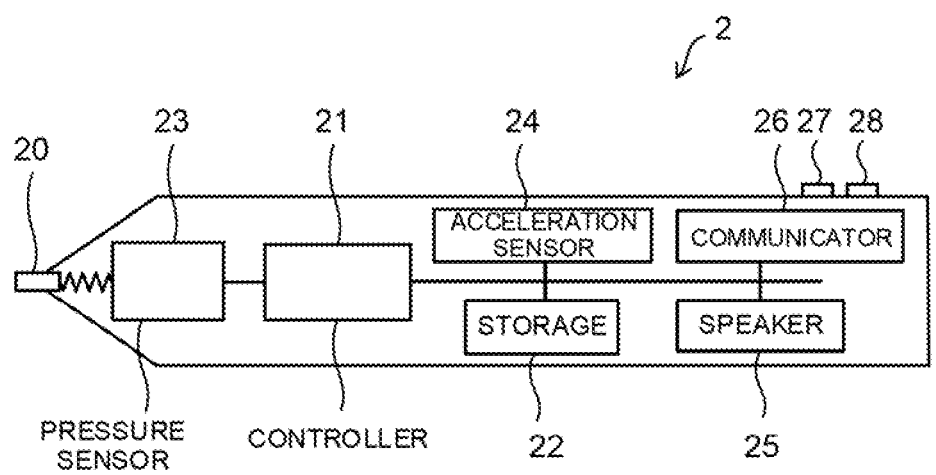
FIG. 3 is a block diagram illustrating a configuration of a touch pen according to the embodiment of the present disclosure.
Figure 4:
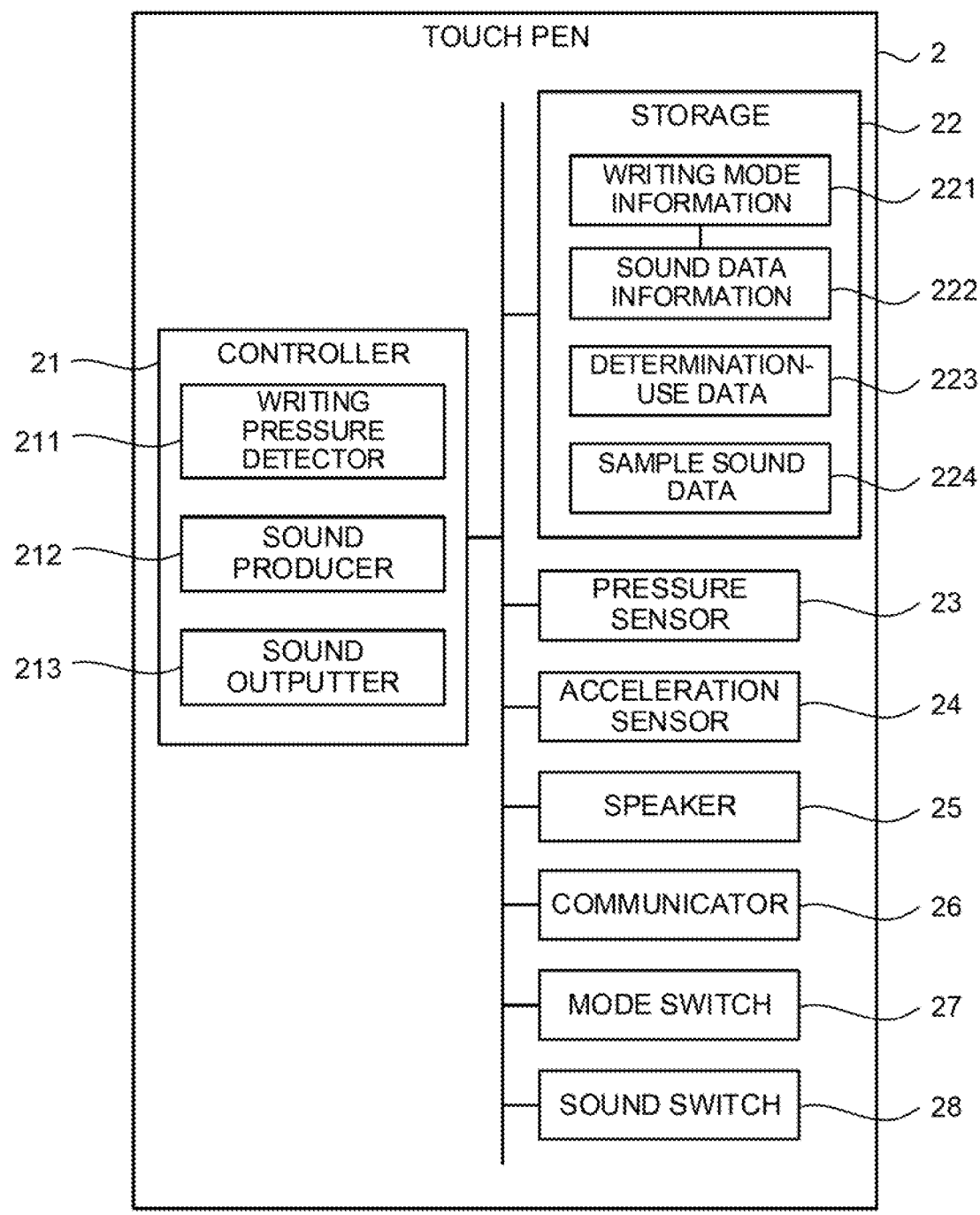
FIG. 4 is a block diagram illustrating a specific configuration of the touch pen according to the embodiment of the present disclosure.

FIG. 3 is a block diagram schematically illustrating a brief configuration of the touch pen 2, and FIG. 4 is a block diagram illustrating a specific configuration of the touch pen 2. The touch pen 2 includes a controller 21, a storage 22, a pressure sensor 23, an acceleration sensor 24, a speaker 25, a communicator 26, a mode switch 27, and a sound switch 28. The pressure sensor 23 is provided in the vicinity of the nib 20 being a first end of the touch pen 2, and the speaker 25 is provided at a second end of the touch pen 2.

The pressure sensor 23 detects a writing pressure applied to the nib 20 if the nib 20 of the touch pen 2 contacts the contact target such as the input surface of the touch panel 14. The contact target is not limited to the input surface of the touch panel 14 and may be a desk or the like. The input surface of the touch panel 14 and a desk are examples of the contact target of the present disclosure. The nib 20 is an example of a tip end of the writing input device of the present disclosure. For example, a known pressure sensor using a piezoelectric element may be applied to the pressure sensor 23. Upon detecting a writing pressure, the pressure sensor 23 outputs a detection signal to the controller 21.

The acceleration sensor 24 detects an inclination with respect to a direction of gravity. Specifically, the acceleration sensor 24 detects an inclination angle of the touch pen 2. The acceleration sensor 24 is provided in the touch pen 2 as necessary, and may also be omitted.

The speaker 25 outputs a predetermined sound according to a command from the controller 21. The speaker 25 is an example of a speaker of the present disclosure. For example, the speaker 25 externally notifies a pseudo sound including a pseudo sound of a hitting sound (first touch sound) generated by the nib 20 contacting the input surface of the touch panel 14 when the user starts writing, and a pseudo sound of a friction sound generated by the nib 20 rubbing (moving on) the input surface while the user writes. The first touch sound is generated as a result of the nib 20 hitting the input surface. The friction sound is generated as a result of the nib 20 moving while the nib 20 contacts the input surface after the nib 20 starts contacting the input surface. The pseudo sound of the first touch sound is an example of a first pseudo sound of the present disclosure, and the pseudo sound of the friction sound is an example of a second pseudo sound of the present disclosure.

It is noted that the speaker 25 may be provided outside the touch pen 2. For example, the speaker 25 may be provided in the electronic board 1 or may be provided in a device outside the touch pen 2 and the electronic board 1. For example, the speaker 25 may be a speaker installed in a meeting room where the writing input system 100 is introduced.

The communicator 26 is a communication interface for connecting the touch pen 2 to a network in a wired or wireless manner to execute data communication with an external device such as the electronic board 1 via the network according to a predetermined communication protocol.

The mode switch 27 is used to switch a writing mode according to the type (including a sound quality, and a timbre) of the pseudo sound. The writing mode includes, for example, a blackboard writing mode M1 corresponding to a sound generated during writing with a chalk on a blackboard, a pencil writing mode M2 corresponding to a sound generated during writing with a pencil on paper, and a ballpoint pen writing mode M3 corresponding to a sound generated during writing with a ballpoint pen on paper. Each time the user depresses the mode switch 27, the writing mode is switched to the blackboard writing mode M11, the pencil writing mode M2, and the ballpoint pen writing mode M3 in order.

The sound switch 28 is used to switch between a sound mode for outputting the pseudo sound and a non-sound mode for not outputting the pseudo sound. If the sound switch 28 is turned on, the mode is switched to the sound mode, and if the sound switch 28 is turned off, the mode is switched to the non-sound mode. If the user desires to output the pseudo sound, the user turns on the sound switch 28 to set the sound mode.

The storage 22 is a non-volatile storage including a semiconductor memory, an HDD, or an SSD that store various types of information. For example, the storage 22 stores a control program such as a sound output program for causing the controller 21 to execute a sound output process (see FIG. 9) described later. For example, the sound output program is recorded non-temporarily on a computer-readable recording medium such as a USB, a CD, or a DVD (all of which are registered trademarks), read by a reading device (not illustrated) such as a USB drive, a CD drive, or a DVD drive electrically connected to the touch pen 2, and stored in the storage 22. The sound output program may be downloaded from an external device via a network and stored in the storage 22.

The storage 22 includes writing mode information 221, sound data information 222, determination-use data 223, and sample sound data 224.

Figure 5:
FIG. 5 is a table showing an example of writing mode information stored in a storage of the touch pen according to the embodiment of the present disclosure.

FIG. 5 is a table showing an example of the writing mode information 221. In the writing mode information 221, information such as the writing modes M1, M2, and M3 is registered. In the writing mode information 221, information on one or more writing modes is registered in advance. The touch pen 2 may be configured to allow a user of the touch pen 2 to add or delete the writing mode as appropriate.

FIG. 6 is a table showing an example of the sound data information 222. In the sound data information 222, information on the writing mode, information on the determination-use data, information on the sample sound data, and sound processing information (for example, a "sound volume coefficient" described later) are registered in association with one another. The writing mode is the writing mode to be registered in the writing mode information 221 shown in FIG. 5.

The determination-use data is data for identifying a first touch from a writing pressure detected by the pressure sensor 23, specifically, is waveform data for identifying the first touch, based on waveform comparison (writing pressure waveform data), or is information on a determination condition for identifying the first touch by a characteristic amount of the writing pressure. The determination-use data is stored in the determination-use data 223 shown in FIG. 7.

For example, if a first touch is identified based on the waveform comparison, in the determination-use data 223, writing pressure waveform data of determination-use data DF11 for a first touch sound having a large writing pressure, writing pressure waveform data of determination-use data DF12 for a first touch sound having a small writing pressure, writing pressure waveform data of determination-use data DR11 of a friction sound having a large writing pressure, and writing pressure waveform data of determination-use data DR12 of a friction sound having a small writing pressure, are registered. It is noted that waveform data obtained by differentiating a change in writing pressure is also registered in the determination-use data corresponding to the first touch sound. In the sound data information 222 (see FIG. 6), identification information of the determination-use data (writing pressure waveform data) registered in the determination-use data 223 shown in FIG. 7 is registered.

In the sound data information 222, the sound processing information is associated with the determination-use data. The sound processing information is set in advance according to the writing pressure of the determination-use data. For example, sound processing information having a large value is associated with the determination-use data DF11 of a first touch sound having a large writing pressure, and sound processing information having a small value is associated with the determination-use data DF12 of a first touch sound having a small writing pressure.

Figure 8:
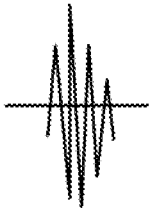
FIG. 8 is a table showing an example of sample sound data stored in the storage of the touch pen according to the embodiment of the present disclosure.
Figure 8:
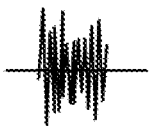

The sample sound data is waveform data (sound waveform data) used as a reference for producing the pseudo sound. The sample sound data is stored in the sample sound data 224 shown in FIG. 8. For example, in the sample sound data 224, sound waveform data of sample sound data of the first touch sound (hereinafter, referred to as "first sample sound data SF1") and sound waveform data of sample sound data of the friction sound (hereinafter, referred to as "second sample sound data SR1"), are registered. In the sound data information 222 (see FIG. 6), identification information of sample sound data (sound waveform data) registered in the sample sound data 224 shown in FIG. 8 is registered.

At least one of the writing mode information 221, the sound data information 222, the determination-use data 223, and the sample sound data 224 in the storage 22 may be stored in a data server (not illustrated) provided outside the touch pen 2. The data server may include a single physical server or a cloud server constructed of a plurality of physical servers.

The controller 21 includes control devices such as a CPU, a ROM, and a RAM. The CPU is a processor that executes various types of arithmetic processes. The ROM is a nonvolatile storage in which a control program such as BIOS and OS for causing the CPU to execute various types of arithmetic processes is stored in advance. The RAM is a volatile or non-volatile storage that stores various types of information, and is used as a temporary storage memory (working area) for various types of processes executed by the CPU. The controller 21 controls the touch pen 2 by causing the CPU to execute the various types of control programs stored in advance in the ROM or the storage 22.

Specifically, as illustrated in FIG. 4, the controller 21 includes various processing operators such as a writing pressure detector 211, a sound producer 212, and a sound outputter 213. It is noted that the controller 21 functions as the various types of process operators by causing the CPU to execute various types of processes according to the sound output program. Moreover, some or all of the process operators included in the controller 21 may include an electronic circuit. It is noted that the sound output program may be a program for causing a plurality of processors to function as the various types of process operators.

Thus, the case where a first touch is identified based on waveform comparison is described; however, if a first touch is identified based on a characteristic amount of a writing pressure, as the determination-use data, a condition for making a determination and a determination condition such as data of a numerical value may be used instead of the waveform data. If the determination condition is used for the determination-use data, as compared to the case where the waveform data is used for the determination-use data, it is possible to reduce an arithmetic process in the determination process as well as a data amount of the determination-use data.

Specifically, the condition for making a determination and the data of a numerical value are a threshold value of an amount of a writing pressure for making a determination and a change amount of a writing pressure, and information on a determination condition for making a determination by using the threshold value. A method for making a determination according to the present method will be described below using an example.

The writing pressure detector 211 detects a writing pressure generated by the nib 20 of the touch pen 2 contacting the contact target. The writing pressure detector 211 is an example of a writing pressure detector according to the present disclosure. Specifically, the writing pressure detector 211 detects the writing pressure, based on a detection signal acquired from the pressure sensor 23 if the nib 20 contacts the input surface of the touch panel 14. For example, the writing pressure detector 211 detects a writing pressure obtained when the nib 20 contacts the input surface of the touch panel 14 (at the time of starting the contact: first touch) upon starting the writing (hereinafter, referred to as "first writing pressure") and a writing pressure obtained when the nib 20 rubs the input surface during the writing (after the contact is started) (hereinafter, referred to as "second writing pressure").

For example, if the change amount of the writing pressure is equal to or more than a first threshold value, the writing pressure detector 211 determines that the contact between the nib 20 and the input surface is now started and detects the first writing pressure. If the change amount of the writing pressure is less than the first threshold value, the writing pressure detector 211 determines that the contact between the nib 20 and the input surface is already started and detects the second writing pressure.

Further, for example, if the writing pressure is changed from less than a second threshold value to a third threshold value or greater, the writing pressure detector 211 may determine that the contact between the nib 20 and the input surface is started and detect the first writing pressure. Thus, the writing pressure detector 211 may detect the first writing pressure, based on the change amount in writing pressure, or may detect the first writing pressure, based on a value of the writing pressure.

In the present embodiment, if the writing pressure is less than the second threshold value, the value of the writing pressure is substantially zero, and it is possible to determine that the nib 20 does not contact the input surface. Further, if the writing pressure is equal to or more than the third threshold value, the value of the writing pressure is more than zero, and it is possible to determine that the nib 20 contacts the input surface. If the writing pressure is somewhere between the second threshold value and the third threshold value, it is not possible to exactly determine whether the nib 20 contacts the input surface, that is, an intermediate state. That is, the writing pressure detector 211 determines, as the time of starting the contact, a timing at which a state where the value of the writing pressure is substantially zero, and it is possible to determine that the nib 20 does not contact the input surface, is changed to a state where the value of the writing pressure is relatively large, and it is possible to determine that the nib 20 contacts the input surface. It is noted that the intermediate state is set to prevent an erroneous determination due to the determination being too sensitive; however, if this prevention is not considered, the second threshold value and the third threshold value may be set to be the same value without setting the intermediate state.

The sound producer 212 produces the pseudo sound, based on the writing pressure detected by the writing pressure detector 211. Specifically, the sound producer 212 produces the pseudo sound by performing sound processing on the writing pressure detected by the writing pressure detector 211. The sound producer 212 is an example of a sound producer of the present disclosure. For example, the sound producer 212 produces a pseudo sound of the first touch sound (hereinafter referred to as "first pseudo sound"), based on the first writing pressure, and a pseudo sound of the friction sound (hereinafter referred to as "second pseudo sound"), based on the second writing pressure. For example, the sound producer 212 produces the first pseudo sound by performing sound processing according to the characteristic of the first writing pressure, on the first sample sound data SF1 stored in the sample sound data 224 (see FIG. 8). The sound producer 212 produces the second pseudo sound by performing sound processing according to the characteristics of the second writing pressure, on the second sample sound data SR1 stored in the sample sound data 224. Examples of the characteristic of the writing pressure include a characteristic of a waveform of the writing pressure and a characteristic of the sound volume.

Specifically, the sound producer 212 firstly determines an output value (waveform data) of the pressure sensor 23, based on the determination condition or the writing pressure waveform data (see FIG. 7) registered in the determination-use data 223. In the determination-use data, the writing pressure waveform data (see FIG. 7) or the determination condition, the sound waveform data (see FIG. 8) of the sample sound data used as a reference corresponding thereto, and the sound processing information are stored in association with one another (see FIG. 6, FIG. 7, and FIG. 8). The sound producer 212 may make the determination, based on the waveform comparison or the determination condition by using the output value of the pressure sensor 23, or may make the determination, based on the waveform comparison or the determination condition by using a differential value. The sound producer 212 finalizes the sample sound data and the sound processing information used to produce the pseudo sounds (the first pseudo sound and the second pseudo sound) by the determination based on the waveform comparison or the determination condition.

Next, the sound producer 212 performs the sound processing according to the sound processing information, on the finalized sample sound data to produce the pseudo sounds (the first pseudo sound and the second pseudo sound). The above-described sound processing information is information for performing the various types of sound processing, and specifically, includes a sound volume coefficient being a coefficient that determines a magnification of a sound volume, a frequency change coefficient being a coefficient that determines a change rate of a sound frequency, or various types of sound processing filters for performing other sound processing (for example, a sound waveform change filter, and a band-pass filter). Examples of the sound processing include a process of amplifying the sample sound data, based on the sound volume coefficient (sound volume adjustment process), a process of modifying a sound frequency of the sample sound data, based on the frequency modulation coefficient (frequency modification process), a process of changing the sound waveform of the sample sound data by using the sound waveform change filter to approximate a specific waveform such as a square wave or a sine wave (sound waveform changing process), and a process of emphasizing the sound of a specific frequency in the sample sound data by using a low-pass filter or a high-pass filter being the band-pass filter (band-pass filter process). Here, as an example, the sound producer 212 performs the sound volume adjustment process according to the sound volume coefficient, on the sample sound data to produce the pseudo sounds.

The sound outputter 213 outputs, from the speaker 25, the pseudo sounds (the first pseudo sound and the second pseudo sound) produced by the sound producer 212. The sound outputter 213 is an example of a sound outputter of the present disclosure.

Here, the writing pressure detector 211 detects the first writing pressure when the nib 20 starts to contact the input surface, and then, detects, as the second writing pressure, the writing pressure lasting until the contact between the nib 20 and the input surface ends. Next, the sound outputter 213 continuously outputs, from the speaker 25, the first pseudo sound and the second pseudo sound produced by the sound producer 212.

Sound Output Process

Figure 9:
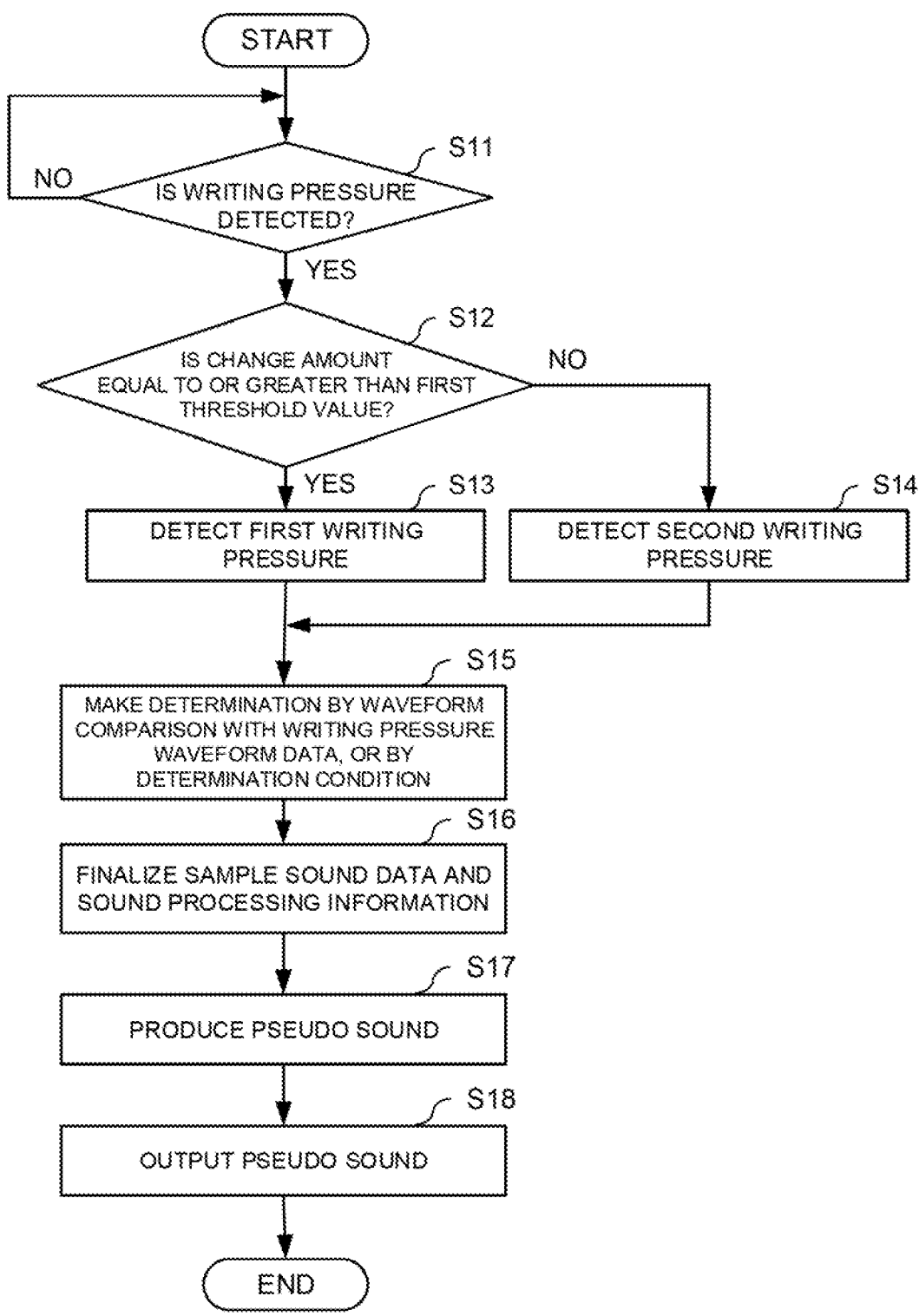
FIG. 9 is a flowchart illustrating an example of a procedure of a sound output process to be executed in a writing input system according to the embodiment of the present disclosure.

An example of the sound output process to be executed by the writing input system 100 will be described with reference to FIG. 9. For example, the sound output process is executed by the controller 21 of the touch pen 2. Here, it is assumed that the writing mode is set to the blackboard writing mode M.

It is noted that the present disclosure can be regarded as an invention of a sound output method in which one or more steps included in the sound output process are executed, and the one or more steps included in the sound output process described here may be omitted where appropriate. In addition, each of the steps in the sound output process may be executed in a different order as long as a similar operation and effect is obtained. Further, although a case where each of the steps in the sound output process is executed by the controller 21 will be described as an example here, a sound output method in which each of the steps in the sound output process is executed in a distributed manner by a plurality of processors may be regarded as another embodiment.

Firstly, in step S11, the controller 21 determines whether or not the writing pressure generated due to the nib 20 of the touch pen 2 contacting the contact target (the input surface of the touch panel 14) is detected. If the controller 21 detects the writing pressure (S11: YES), the process proceeds to step S12.

In step S12, the controller 21 determines whether or not the change amount of the writing pressure is equal to or more than the first threshold value. If the change amount of the writing pressure is equal to or more than the first threshold value (S12: YES), the process proceeds to step S13, and if the change amount of the writing pressure is less than the first threshold value (S12: NO), the process proceeds to step S14.

In step S13, the controller 21 detects the writing pressure (first writing pressure) obtained at the time of starting the contact (first touch). On the other hand, in step S14, the controller 21 detects the writing pressure (second writing pressure) obtained after the start of the contact. After steps S13 and S14, the process proceeds to step S15.

In step S15, the controller 21 makes the determination by the waveform comparison where the waveform data of the detected writing pressure (the first writing pressure or the second writing pressure) is compared with the writing pressure waveform data (see FIG. 7) registered in the determination-use data 223, or by the determination condition.

Next, in step S16, the controller 21 finalizes the sample sound data and the sound processing information associated with the determination-use data determined by the waveform comparison or the determination by the determination condition (see FIG. 6).

Next, in step S17, the controller 21 performs the sound processing according to the sound processing information onto the finalized sample sound data to produce the pseudo sounds (the first pseudo sound and the second pseudo sound).

Finally, in step S18, the controller 21 causes the produced pseudo sounds (the first pseudo sound and the second pseudo sound) to be output from the speaker 25. The sound output process is executed according to the above procedure.

As described above, the writing input system 100 according to the present embodiment includes a configuration in which the pseudo sounds are produced based on the writing pressure detected by the nib 20 of the touch pen 2 contacting the contact target (the input surface of the touch panel 14, for example), and the produced pseudo sounds are output. This enables reproduction of the sound (first touch sound), particularly generated by the first touch. This also enables reproduction of the sound (friction sound) during writing subsequent to the first touch. This also enables change of the sound volume of the pseudo sounds according to a magnitude of the writing pressure. With these configurations, since the pseudo sounds of a writing sound to be generated can be output according to a writing state of a user, the reproducibility of the writing sound can be improved, and a sound output without a sense of incongruity can be achieved.

The present disclosure is not limited to the above-described embodiment. A modification corresponding to another embodiment of the present disclosure will be described below.

First Modification

The hitting sound (first touch sound) generated by the first touch may differ depending on an angle of the touch pen 2 with respect to the input surface when the nib 20 contacts the input surface of the touch panel 14 as well as the writing pressure. For example, the sound quality and the sound volume of the first touch sound may differ depending on whether the angle of the touch pen 2 with respect to the input surface is vertical or inclined.

In the writing input system 100 according to a first modification, the controller 21 detects the angle of the touch pen 2 with respect to the input surface of the touch panel 14, based on the inclination angle detected by the acceleration sensor 24. Next, the controller 21 (sound producer 212) produces the pseudo sounds, based on the writing pressure detected by the writing pressure detector 211 and the angle of the touch pen 2. In this case, for example, in the determination-use data 223, determination-use data corresponding to the writing pressure and the angle of the touch pen 2 may be stored. The sound producer 212 makes the determination by the waveform comparison or the determination condition, based on the writing pressure detected by the writing pressure detector 211 and the angle of the touch pen 2, and finalizes the sample sound data and the sound processing information.

With this configuration, the accuracy of the determination by the waveform comparison or the determination condition can be improved to output the pseudo sounds with higher reproducibility.

Second Modification

The writing input system 100 may produce the pseudo sound of the friction sound, based on a moving speed (drawing speed) of the touch pen 2. For example, the controller 21 calculates the moving speed by using the acceleration sensor 24. The moving speed is calculated by time-integrating a detection value of the acceleration sensor 24. The controller 21 functions as a moving speed calculator.

Next, the sound producer 212 produces the second pseudo sound by performing sound processing according to a characteristic of the second writing pressure and the moving speed, on the second sample sound data. Specifically, the sound producer 212 makes the determination by the waveform comparison or the determination condition, based on the second writing pressure detected by the writing pressure detector 211 and the moving speed calculated by the acceleration sensor 24, finalizes the second sample sound data and the sound processing information, and produces the pseudo sound. Thus, since the pseudo sound of the friction sound is produced by using the writing pressure and the moving speed, the reproducibility of the friction sound can be improved.

In the above example, the moving speed is calculated by using the detection value of the acceleration sensor 24; however, as another example, the controller 11 of the electronic board 1 may calculate the moving speed. In this case, the electronic board 1 notifies the touch pen 2 of information on the calculated moving speed, and the touch pen 2 produces the pseudo sound, based on the information on the moving speed acquired from the electronic board 1.

Third Modification

In each of the above embodiments, once the user turns on the sound switch 28, the pseudo sounds may be output even if the user brings the touch pen 2 into contact with a contact target other than the touch panel 14. For example, the pseudo sounds are output if the user touches or rubs a desk with the nib 20 of the touch pen 2. Thus, since the user can bring the touch pen 2 into contact with various contact targets so that the pseudo sounds can be output, a usage mode of the touch pen 2 can be expanded.

On the other hand, the user may wish a configuration where the pseudo sound is output only if the user brings the touch pen 2 into contact with touch panel 14, and the pseudo sound is not output if the user brings the touch pen 2 into contact with an object (such as a desk) other than the touch panel 14. To realize this configuration, in the writing input system 100 according to a third modification, a detection signal is notified to the touch pen 2 if the controller 11 (input detector 111) of the electronic board 1 detects position coordinates input (designated) by the touch pen 2. If the touch pen 2 acquires the detection signal from the electronic board 1, the sound output process (see FIG. 9) is executed. As a result, it is possible to prevent the output of the pseudo sound not intended by the user.

In the writing input system 100 according to each of the above embodiments, the processing operators (the writing pressure detector 211, the sound producer 212, and the sound outputter 213) of the controller 21 of the touch pen 2, and information (the writing mode information 221, the sound data information 222, the determination-use data 223, and the sample sound data 224) stored in the storage 22 may be included in the electronic board 1. The speaker 25 may be included in the electronic board 1. For example, the electronic board 1 may include speakers 25 at two locations, that is, right and left, and the electronic board 1 may have a configuration in which the pseudo sound is output from either the right speaker 25 or the left speaker 25, whichever is closer to a position (position coordinates) at which the touch input by the touch pen 2 is received.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A writing input device capable of performing writing input on a touch panel, the writing input device comprising:
   a writing pressure detector that detects a writing pressure generated by a tip end of the writing input device contacting a contact target;
   a sound producer that produces a pseudo sound, based on the writing pressure detected by the writing pressure detector; and
   a sound outputter that outputs the pseudo sound produced by the sound producer, wherein
   the writing pressure detector detects a first writing pressure that is generated by the tip end contacting the contact target at a start of contact between the tip end and the contact target, and then detects a second writing pressure that is generated by the tip end contacting the contact target and lasts until the contact between the tip end and the contact target ends,
   the sound producer produces a first pseudo sound based on the first writing pressure, and produces a second pseudo sound based on the second writing pressure,
   the sound outputter continuously outputs the first pseudo sound and the second pseudo sound produced by the sound producer, the first pseudo sound is a pseudo sound of a first touch sound being a sound generated by the tip end hitting the contact target at the start of the contact between the tip end and the contact target, and the second pseudo sound is a pseudo sound of a friction sound generated when the tip end moves while contacting the contact target after the contact between the tip end and the contact target starts.

2. The writing input device according to claim 1, wherein the writing pressure detector detects the first writing pressure by determining the start of the contact between the tip end and the contact target if a change amount of the writing pressure is equal to or greater than a first threshold value.

3. The writing input device according to claim 1, wherein the writing pressure detector detects the first writing pressure by determining the start of the contact between the tip end and the contact target if the writing pressure is changed from less than a second threshold value to a third threshold value or greater.

4. The writing input device according to claim 1, further comprising: a storage that stores first sample sound data, wherein the sound producer produces the first pseudo sound by performing sound processing according to a characteristic of the first writing pressure, on the first sample sound data.

5. The writing input device according to claim 1, further comprising:

a storage that stores second sample sound data; and a moving speed calculator that calculates a moving speed of the tip end with respect to the contact target, wherein the sound producer produces the second pseudo sound by performing sound processing according to a characteristic of the second writing pressure and the moving speed, on the second sample sound data.

6. The writing input device according to claim 1, further comprising: a speaker that outputs sound, wherein the sound outputter outputs the pseudo sound produced by the sound producer, from the speaker.

7. A writing input system, comprising: a touch panel; and a writing input device capable of performing writing input on the touch panel, the writing input system, further comprising:

a writing pressure detector that detects a writing pressure generated by a tip end of the writing input device contacting a contact target;

a sound producer that produces a pseudo sound, based on the writing pressure detected by the writing pressure detector; and a sound outputter that outputs the pseudo sound produced by the sound producer, wherein the writing pressure detector detects a first writing pressure that is generated by the tip end contacting the contact target at a start of contact between the tip end and the contact target, and then detects a second writing pressure that is generated by the tip end contacting the contact target and lasts until the contact between the tip end and the contact target ends, the sound producer produces a first pseudo sound based on the first writing pressure, and produces a second pseudo sound based on the second writing pressure, the sound outputter continuously outputs the first pseudo sound and the second pseudo sound produced by the sound producer, the first pseudo sound is a pseudo sound of a first touch sound being a sound generated by the tip end hitting the contact target at the start of the contact between the tip end and the contact target, and the second pseudo sound is a pseudo sound of a friction sound generated when the tip end moves while contacting the contact target after the contact between the tip end and the contact target starts.

\* \* \* \* \*